(12) United States Patent
Raghu

(10) Patent No.: US 8,382,043 B1
(45) Date of Patent: Feb. 26, 2013

(54) METHOD AND APPARATUS FOR AERODYNAMIC FLOW CONTROL USING COMPACT HIGH-FREQUENCY FLUIDIC ACTUATOR ARRAYS

(76) Inventor: Surya Raghu, Columbia, MD (US)

( * ) Notice: Subject to any disclaimer, the term of this patent is extended or adjusted under 35 U.S.C. 154(b) by 248 days.

(21) Appl. No.: 12/804,225

(22) Filed: Jul. 16, 2010

Related U.S. Application Data

(60) Provisional application No. 61/274,417, filed on Aug. 17, 2009.

(51) Int. Cl.
*B64C 21/04* (2006.01)

(52) U.S. Cl. .................. 244/207; 244/204; 244/1 N

(58) Field of Classification Search .............. 244/1 N, 244/200, 200.1, 204, 204.1, 207, 208, 209
See application file for complete search history.

(56) References Cited

U.S. PATENT DOCUMENTS

| | | | |
|---|---|---|---|
| 4,508,267 A | 4/1985 | Stouffer | |
| 6,253,782 B1 | 7/2001 | Raghu | |
| 6,457,654 B1 * | 10/2002 | Glezer et al. | 239/4 |
| 6,978,951 B1 | 12/2005 | Raghu | |
| 7,128,082 B1 | 10/2006 | Cerretelli et al. | |
| 2008/0149205 A1 * | 6/2008 | Gupta et al. | 137/829 |

OTHER PUBLICATIONS

N. Lucas, I. Taubert, R. Woszidlo, I. Wygnanski and M. A. Mc Veigh, "Discrete Sweeping Jets as Tool for Separation Control", AIAA 2008-3868, presented at the 4th Flow Control Conference, Jun. 23-26, 2008, Seattle Washington, pp. 1-14.

Rene Woszidlo, Holger Nawroth, Surya Raghu and Israel J. Wygnanski, "Parametric Study of Sweeping Jet Actuators for Separation Control", AIAA 2010-4247, presented at the 5th Flow Control Conference, Jun. 28-Jul. 1, 2010, Chicago, Illinois, pp. 1-21.

Thomas M. Crittenden and Surya Raghu, "Combustion Powered Actuator With Integrated High Frequency Oscillator", Int. Conf. on Jets, Wakes, and Separated Flows, ICJWSF-2008 Sep. 16-19, 2008, Technical University of Berlin, Berlin, Germany, pp. 1-8.

Surya Raghu and Ganesh Raman, "Miniture Fluidic Devices for Flow Control", Proceedings of FEDSM'99, 1999 ASME Fluids Engineering Division Summer Meeting, FEDSM99-7256, Jul. 18-22, 1999, San Francisco, pp. 1-6.

James W. Gregory, John P. Sullivan, Ganesh Raman and Sury Raghu, "Characterization of a Micro Fluidic Oscillator for Flow Control", 2nd AIAA Flow Control Conference, Portland, OR, Jun. 28-Jul. 1, 2004, pp. 1-14.

* cited by examiner

*Primary Examiner* — Tien Dinh
*Assistant Examiner* — Richard R Green
(74) *Attorney, Agent, or Firm* — Ellis P. Robinson

(57) ABSTRACT

The present invention is directed to the manufacture of and the use of an aerodynamic flow control device having a compact array of a plurality of fluidic actuators in planar, curved, circular and annular configurations. The compact array of fluidic actuators of the invention may be designed to produce oscillating or pulsed jets at the exit ports with frequencies in the range of 1-22 kHz. They may be integrally manufactured along with the wing sections, flaps, tail and rudder of airplane, the inlet or exit geometries of a jet engine. When supplied with a source of fluid such as air, these arrays of actuators produce a set of fluid jets of random phase of high velocity and influence the main stream of air over the subject surface. The beneficial effects of modifying flow using the present invention include increased lift, reduced drag, improved performance and noise reduction in jet engines.

12 Claims, 8 Drawing Sheets

Actuator array near the trailing edge of the airfoil

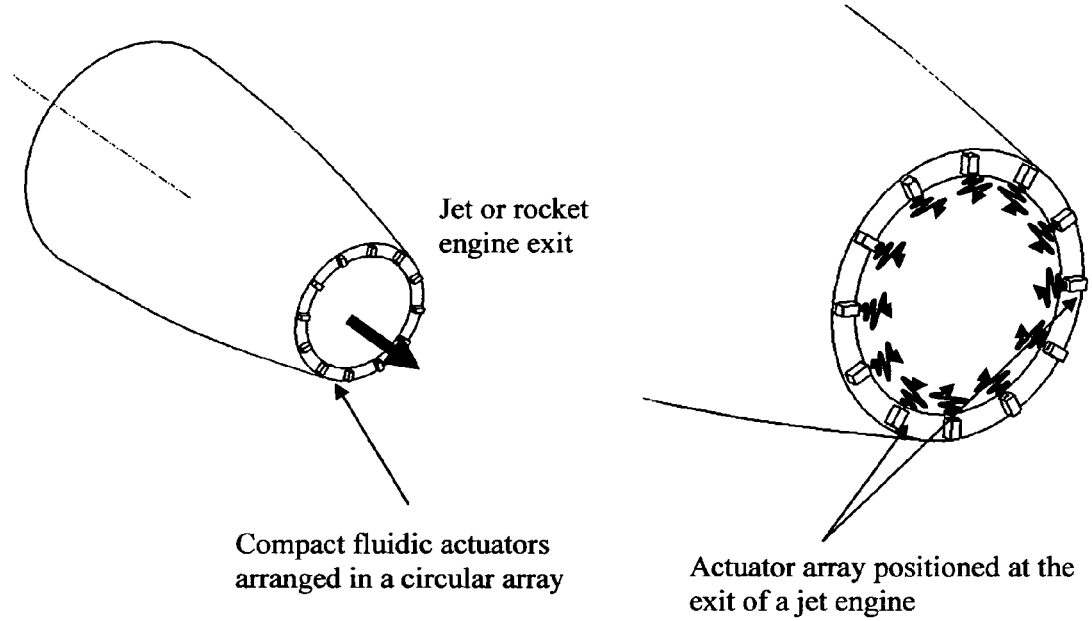
Figure 3a
Figure 3b
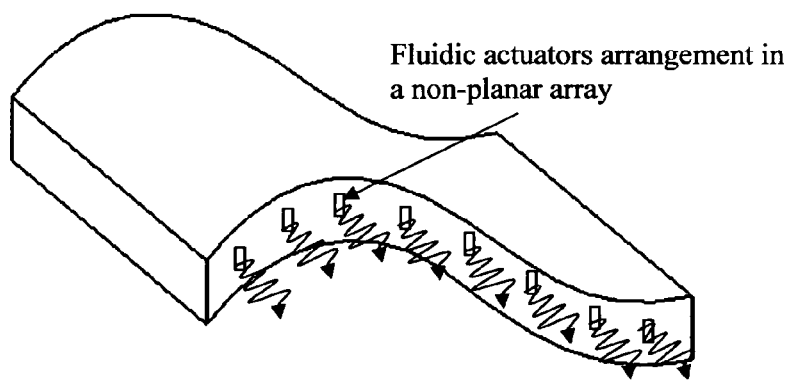
Figure 4

Fluidic actuator arranged in two layers – top and bottom rows in a staggered fashion

METHOD AND APPARATUS FOR AERODYNAMIC FLOW CONTROL USING COMPACT HIGH-FREQUENCY FLUIDIC ACTUATOR ARRAYS

CROSS-REFERENCE TO RELATED APPLICATIONS

This application claims the benefit of the filing date of Provisional Patent application 61/274,417 filed on Aug. 17, 2009.

BACKGROUND OF THE INVENTION

The aerodynamic design of future aerospace vehicles will be greatly influenced by active flow control (AFC) technologies available for jet engine inlet and exhaust systems, aerodynamic surfaces including high-lift devices, thrust vectoring, weapons-bay cavity flow/acoustics, impingement jet noise reduction, and propulsion devices such as jet engines and rockets. These flow control systems will be used in a variety of flow situations to modify the shear layers and control mixing, energize the boundary layers to control flow separation, produce jet deflections to produce thrust vectoring and to control resonant cavity oscillations. An important aspect of the active flow control technology is the effective strategic deployment of suitable flow actuators. A variety of flow control actuators such as plasma-fluidic actuators, Powered Resonance Tubes (PRTs), piezoelectric actuators, synthetic jets, combustion-based flow actuators, blowing and suction holes, supersonic micro jets, and fluidic jets are currently being studied for flow control. These flow control actuators produce a steady, oscillating or pulsating acoustic, momentum or mass flow fields over a range of frequencies to affect the flow that is being controlled. Although most of these devices have demonstrated significant levels of flow control in laboratory scale experiments, integration of such systems into actual hardware of aerospace vehicles have remained a real challenge. These devices are required to operate under dynamic and harsh environments such as a wide range of temperatures, high levels of noise, vibration and shock loads as well as varying material stresses. Hence their performance should be robust, reliable with long, uninterrupted life cycle and should have a high degree of compatibility to be integrated with the system hardware.

While fluidic actuator oscillators are well known in the art, arranging them in a compact manner with common inlet manifolds to meet the demands of integration with airplane systems for application to flow control over the entire flight envelope (take-off, cruise and landing) is a challenging task and is an important feature of the present invention.

One such prior invention is described in Cerretelli et. al. (U.S. Pat. No. 7,128,082 B1) which is directed to the employment of a flow control system which includes an array of interconnected fluidic oscillators in a gas turbine engine and a gas turbine blade. Each fluidic oscillator in the array disclosed by Cerretelli et. al. carries an oscillating flow of the fluid and includes a throat, an input port connected to the throat, two control ports connected to the throat and two output or exit ports extending from the throat. Cerretelli et. al. fluidic oscillators are interconnected by shared feedback chambers and the exit ports produce pulsing jets in the same plane as the input flow for each fluidic oscillator in their array.

Another prior art invention directed to fluidic oscillators and their use in separation control is disclosed by Lucas et. al. (N. Lucas, 1. Taubert, R. Woszidlo, I. Wygnanski and M. A. Mc Veigh, "Discrete Sweeping Jets as Tool for Separation Control", AIAA 2008-3868, presented at the $4^{th}$ Flow Control Conference, Jun. 23-26, 2008, Seattle Wash.). Lucas et. al. disclose that a span wise line of discrete jets pointing in the direction of streaming and sweeping span wise provides effective flow control on various types of airfoils. Lucas et. al. disclose that their fluidic actuators produced frequencies of jet oscillations in the range of 0.3 to 1.2 kHz without disclosing the specific structure and design of the individual actuators, It is apparent from reading Lucas et. al. that the design of the fluidic actuator oscillators in their disclosed array are structurally and functionally different from the fluidic actuators of the present invention. For example, apparently each of the fluidic actuator oscillator designs that are relied upon and used in the arrays tested by Lucas et. al. have at least two input ports.

A compact array of independent, discrete or non-interconnected fluidic actuator oscillators is disclosed in the present invention each having a single input port which produces a single oscillating/sweeping or pulsing jet at each exit port for each fluidic actuator. When an exit pulsing jet is produced in the present invention it has a plane that may be typically perpendicular to the plane of the fluid flow inside the actuator. In the present invention each fluidic actuator oscillator in the array produces at the exit port an oscillating or sweeping jet of a much higher frequency than those previously used in prior art arrays, typically in the order of 1-22 kHz and with sweep angles between 20 to 120 degrees. An additional distinction over Cerretelli et. al. arrays is that their arrays cannot be manufactured in a single planar fashion because of the large volumes of the feedback paths or integrated with aerospace systems as easily as those of the present invention.

SUMMARY OF THE PRESENT INVENTION

The present invention is directed to an aerodynamic flow control device or apparatus having a compact array of a plurality of discrete fluidic actuator oscillators in a two-dimensional array either in a planar or linear fashion as shown for example in FIGS. 1a-1c and 2 or circular fashion or a non-planar structure as shown for example in FIGS. 3a, 3b and 4. The aerodynamic flow control device of the present invention is a compact array of a plurality of discrete or non-interconnected fluidic actuators situated on a substrate. Each one of the fluidic actuators has an input port and an exit port as shown in FIG. 7 and is capable of producing at the exit port an oscillating jet or sweeping jet. The compact array of the aerodynamic device of the present invention may include a plenum chamber commonly connected to each of the plurality of discrete fluidic actuator oscillators. Fluid may be supplied to the plurality of discrete fluidic actuators by means of the commonly connected plenum chamber.

In another feature of the present invention, the aerodynamic flow control device of the present invention may be in the form of a composite assembly or structure having a compact array of a plurality of discrete or non-interconnected fluidic actuator elements located on a substrate which may be planar or curved. The composite assembly or structure may contain a single layer or double sided single layers or multiple layers of a plurality of discrete or non-interconnected fluidic actuator oscillators wherein each of the fluidic actuator elements of the composite assembly each have an input port and an exit port capable of producing a high frequency oscillating or sweeping jet typically in the order of 1-22 kHz and with sweep angles between 20 to 120 degrees. The composite assembly additionally may include a cover plate and a plenum chamber which is commonly connected to each of the plurality of discrete fluidic actuator oscillators. Fluid may be supplied to the plenum chamber of the composite assembly by means of a connector device which may be separately or integrally attached to the cover plate.

Another feature of the present invention includes an extension chamber as shown in FIG. 9. The extension chamber may be employed with the aerodynamic flow control device having a compact array of a plurality of discrete fluidic actuator oscillators in a two-dimensional array either in a linear or planar fashion as shown for example in FIGS. 1a-1c and 2 or circular fashion or non-planar structure as shown for example in FIGS. 3a, 3b and 4 or in the composite assembly aerodynamic flow control device of the present invention described in the above paragraph. One function of the extension chamber is its ability to direct the jets exiting the fluidic actuator array in a preferred direction.

In addition to the individual or discrete fluidic actuator oscillators disclosed in detail in the above paragraphs in this invention, it is possible to use other prior art fluidic oscillators such as the designs disclosed in Raghu (U.S. Pat. Nos. 6,253,782 and 6,978,951) the full disclosures of which are hereby incorporated by reference. This second group of fluidic actuator oscillators disclosed in these two prior patents are structurally and functional distinct from the first fluidic actuator oscillators described above for use in the present invention. However, the fluidic actuators of the two Raghu prior patents may be used to fabricate aerodynamic devices comprising compact arrays of fluidic actuators that have similar structural and design features to compact arrays described above and shown in the figures for the first group of fluidic actuators yet having distinctly different flow control, noise reduction and other aerodynamic properties. The compact arrays of these fluidic actuators are useful for flow control and noise reduction in jet engine inlet and exhaust systems, aerodynamic surfaces including high-lift devices, thrust vectoring, weapons-bay cavity flow/acoustics, impingement jet noise reduction, and propulsion devices such as jet engines and rockets. These flow control systems may also be employed in a variety of flow situations to modify the shear layers and control mixing, energize the boundary layers to control flow separation, produce jet deflections to produce thrust vectoring and to control resonant cavity oscillations. The present invention is further directed to aerodynamic devices that a) solely comprise compact arrays of the first described fluidic actuator oscillators of the present invention, b) solely comprise compact arrays of fluidic actuators of the type disclosed in the two prior Raghu patents or c) a combination of compact arrays of fluidic actuators of each type strategically placed in different locations to provide specific aerodynamic properties in a predetermined location or locations of a single aerodynamic device.

All of the devices of the present invention are easy to integrate into the wing section of an airfoil of an airplane wing, a wing flap, a tail rudder and its flap or an inlet vane of a compressor blade or on a wind turbine blade, an intake of an aircraft engine, into the exhaust section of a jet of gas (mixture of gases) exiting from a nozzle. For example, flow control separation is enabled by incorporating the aerodynamic flow control device having a compact array of a plurality of fluidic actuators of the present invention into airfoil sections at various locations along the chord or on the flap of the wing. This results in increased lift force, reduction of aerodynamic drag and reduction of download during vertical take-off and landing operations. Similarly, incorporating the aerodynamic flow control devices of the present invention into the rudder or tail wing will result in increased control forces required to steer the airplane thus reducing the tail wing size for generating a required control force. This will result in savings of weight and fuel required for the flights.

For applications to helicopters, incorporating the array of fluidic actuators at proper locations on the fuselage surface of a helicopter will also reduce the drag and increase the forward flight speed of a helicopter. Use of such arrays on the helicopter blades will prevent aerodynamic stall of sections of the helicopter blades subjected to very low relative air speeds.

Use of these compact arrays of a plurality of fluidic actuators in the stator vanes will result in better pressure recovery characteristics by increased loading of the compressor and reduce the number of stator vanes required thus resulting in reduced weight and improved performance.

Wind turbine blades with flow control using compact arrays of the plurality of fluidic actuators of the present invention will generate increased power for a given size of the turbine blade and can operate at lower wind speeds. At very large wind speeds, the flow over the turbine blade can be modified to reduce the load on the turbine and during very low wind speeds, the flow can be modified to increase the lift force or the turbine torque.

Flow control using the present invention in inlet ducts of airplane engines will permit use of complex inlet geometries suited for positioning the jet engines at locations advantageous for the flight performance of the airplane. The use of compact arrays of the plurality of fluidic actuators of the present invention will prevent flow separating from the interior walls of the inlet duct and thus provide a uniform distribution of air into the engine.

The compact arrays of the present invention have excellent utility in the design of short diffusers and Vertical or Short Take Off and Landing (V/STOL) aircraft applications. The design of short diffusers involves large divergence angles for the flow. Such large divergence angles need flow control to keep the flow attached to the surfaces of the diffuser walls. The flow control required is accomplished by the utilization of the compact arrays of fluidic actuators of the present invention. Short diffusers increase the efficiency of energy conversion from kinetic energy to pressure energy. One application of such short diffusers is in certain kinds of vertical and short take off and landing aircraft designs.

These compact fluidic actuators can also be used for noise reduction in jet and rocket engines and the like by modifying the structure of the fluid flow emanating from the exhaust. The main source of aerodynamic noise in jet and rocket engine exhausts is the organized vortical structures emanating from the near-field of the exiting jet. By injecting small amounts of momentum in the edge of the jet from an array of randomly oscillating jets, these organized axisymmetric vortical structures are disintegrated into non-coherent structures thereby weakening the source of aerodynamic noise.

These actuators can also be used with liquids such as water in under-water applications for improved performance of underwater vehicles. In analogy with producing sweeping jets in air, these actuators produce sweeping liquid jets and hence can be used for flow control in hydrofoils (moving in water). Examples are stator vanes in submarines, tail rudders in speed boats and ships.

Similar arrays can also be used to enhance mixing of two fluids such as the gaseous mixing required in a combustion chamber of a gas turbine in order to improve the combustion efficiency and reduce nitric oxide emissions. Gaseous fuel supplied through an array of fluidic oscillating jets has better mixing properties than non-oscillating jets. This mixing results in better mixing of the fuel and air (oxygen) to ensure complete and efficient combustion of the fuel gas.

The arrays of this invention are currently fabricated using both metals such as aluminum and stainless steel and various types of engineering plastics depending on the requirements of the specific application. The new light weight and high-strength, high technology synthetic materials currently being developed would also lend themselves to the manufacturing of these arrays potentially resulting in added strength and reduced cost of manufacturing.

BRIEF DESCRIPTION OF THE DRAWINGS

FIGS. 3a and 3b illustrate jet noise control utilizing compact fluidic actuator arrays in circular and annular configurations.

FIG. 4 displays a fluidic actuator array in a non-planar configuration.

FIG. 7 illustrates a detailed view of the compact flow control actuator array as shown in FIG. 1a.

DETAILED DESCRIPTION OF THE INVENTION

Figure 1A:
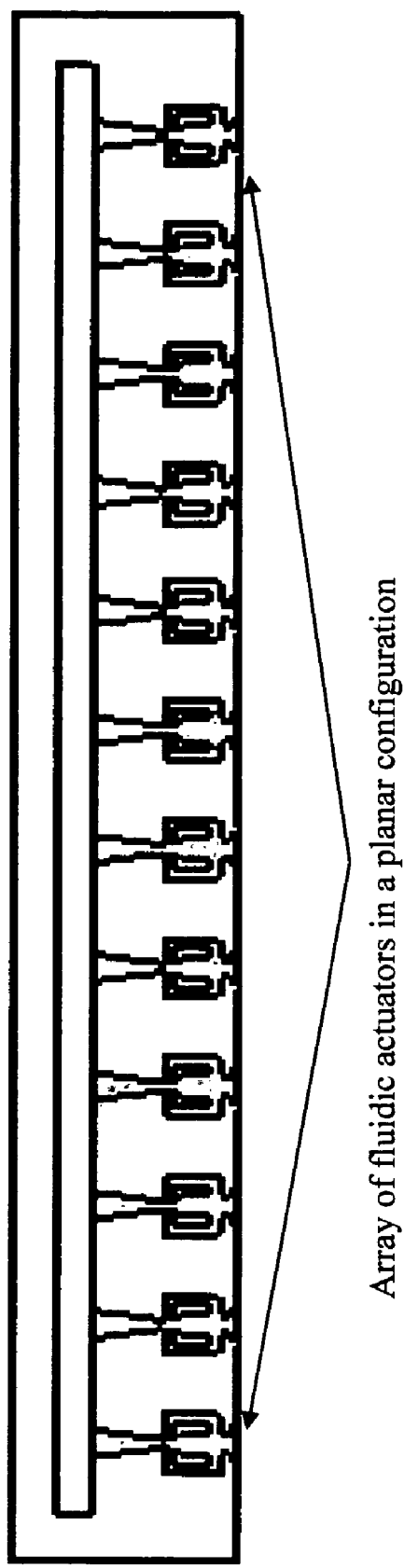
FIG. 1a is a view of a fluidic actuator array integrated with a common plenum chamber.
Figure 1B:
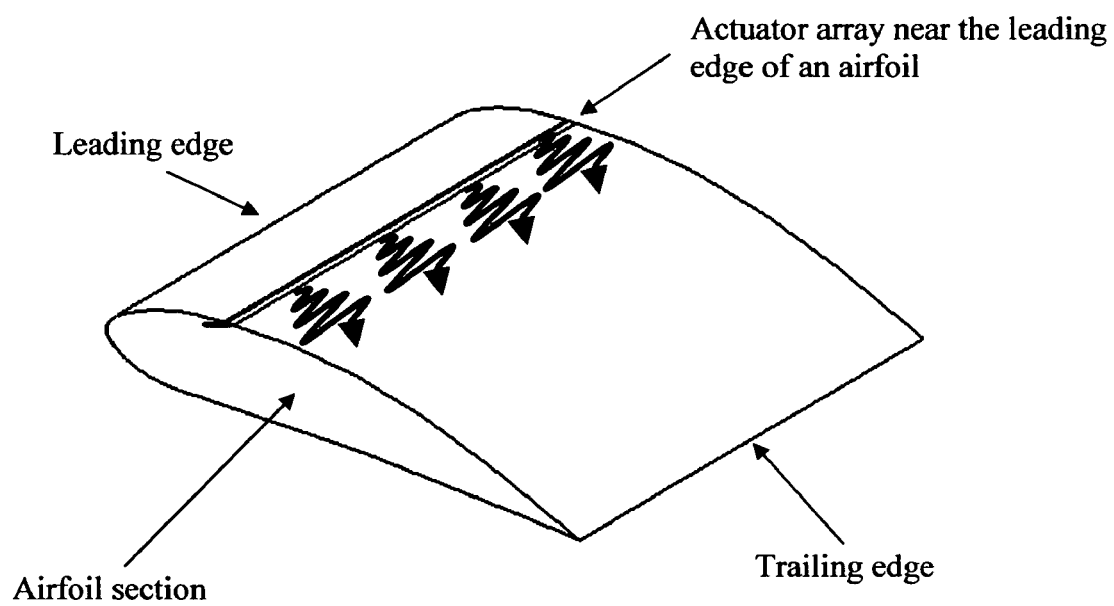
FIG. 1b is a view of a fluidic actuator array embedded in a leading edge of an airfoil or a flap.
Figure 1C:
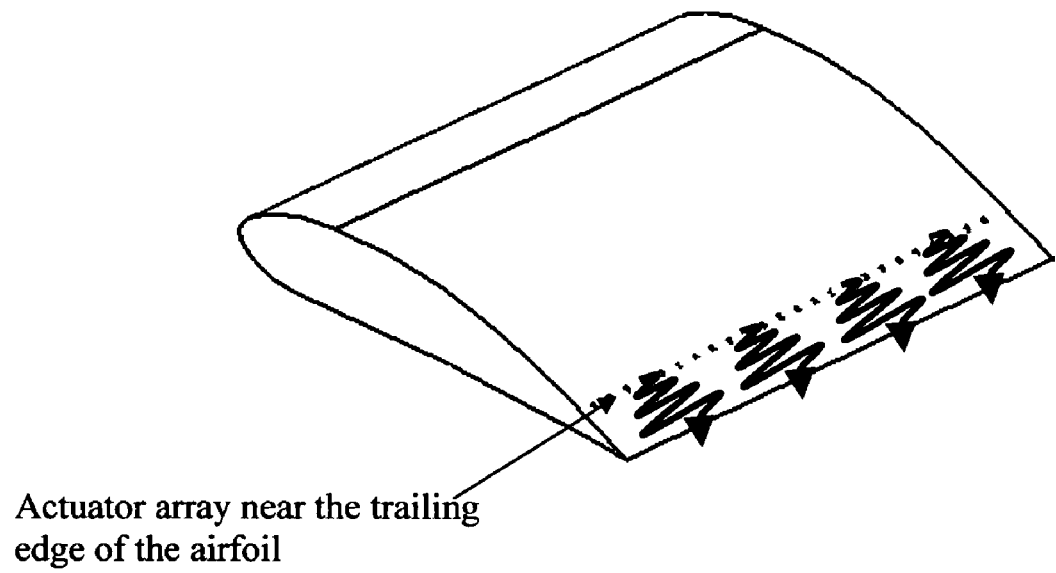
FIG. 1c is a view of a fluidic actuator array embedded in the trailing edge of an airfoil.

FIG. 1a shows an array of discrete fluidic oscillators with a common plenum chamber to supply air to all the actuators. Such an array of actuators can be integrated into an airfoil to produce arrays of oscillating jets with frequency in the range of 1-22 kHz and with sweep angles between 20 to 120 degrees. Possible configurations for flow control over an airfoil are shown in FIG. 1b and FIG. 1c. In FIG. 1b, the array is placed closer to the leading edge for separation control at high angles of attack. The oscillating jets exit tangential to the local surface. FIG. 1c illustrates the location of the array for circulation and airfoil wake control. The exact chord-wise position, both for leading edge and trailing edge flow control, depends on the particular airfoil characteristics. Similar flow control schemes can be incorporated in leading edge slats and trailing edge flaps currently used for high-lift configurations to further enhance the performance of such devices.

Figure 2:
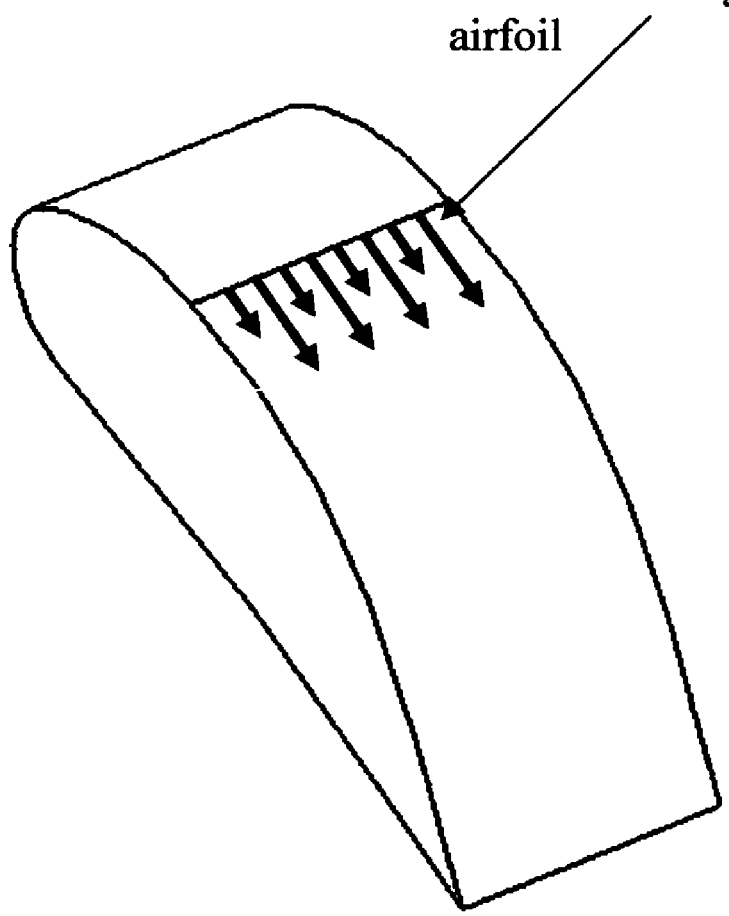
FIG. 2 depicts static wake control with fluidic diverter arrays with pulsed mass-flow injection.
Figure 5:
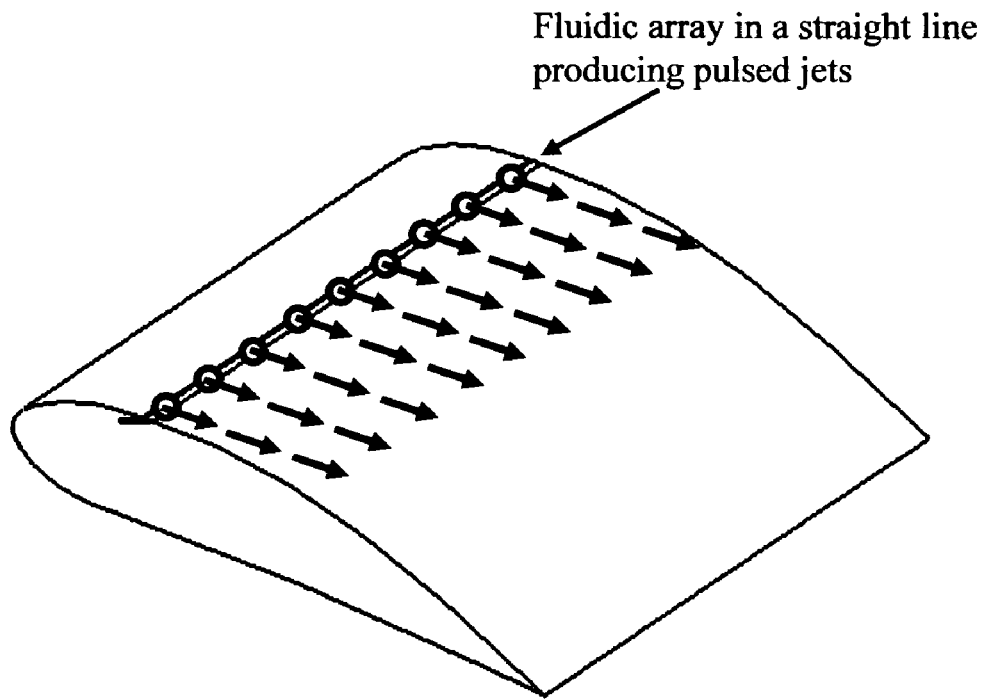
FIGS. 5 and 6 illustrate actuator arrays producing pulsed jets either in a straight line or in a staggered arrangement.
Figure 6:
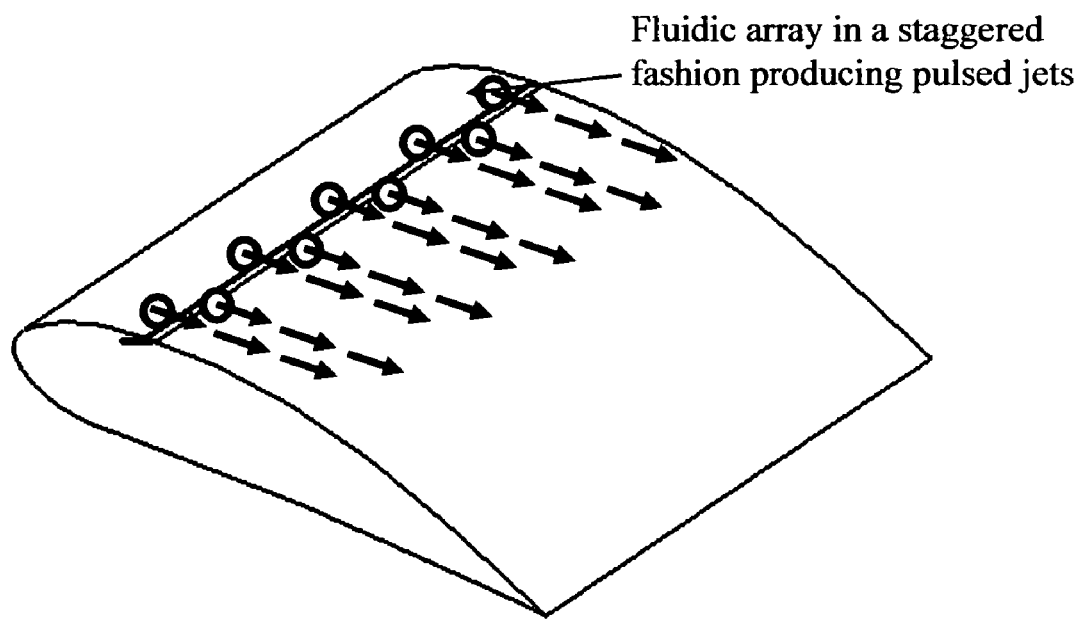

With a slight modification of the exit geometry, by adding a splitter channel, we could have arrays of alternately pulsing pairs of fluidic jets instead of oscillating jets. Such pulsed mass flow injection could provide potential flow control in turbo machinery applications for inlet stator wake control and film cooling as shown in FIG. 2. It is also possible to design such oscillating or pulsing jet arrays in circular or annular configurations (FIG. 3) as well as three dimensional geometries for flow and noise control but the design of the plenum chamber would be a little more complex than for two-dimensional arrays. The actuators can be arranged to create the jets in different directions. For applications where the array needs to be in a non-planar configuration, these actuators can be designed in a curved plane as shown in FIG. 4. The exit geometry can also be modified to produce pulsed jets in a plane perpendicular to the plane of the inlet flow and this can be arranged either in a straight line or staggered arrangement as shown in FIGS. 5 and 6.

Figure 7:
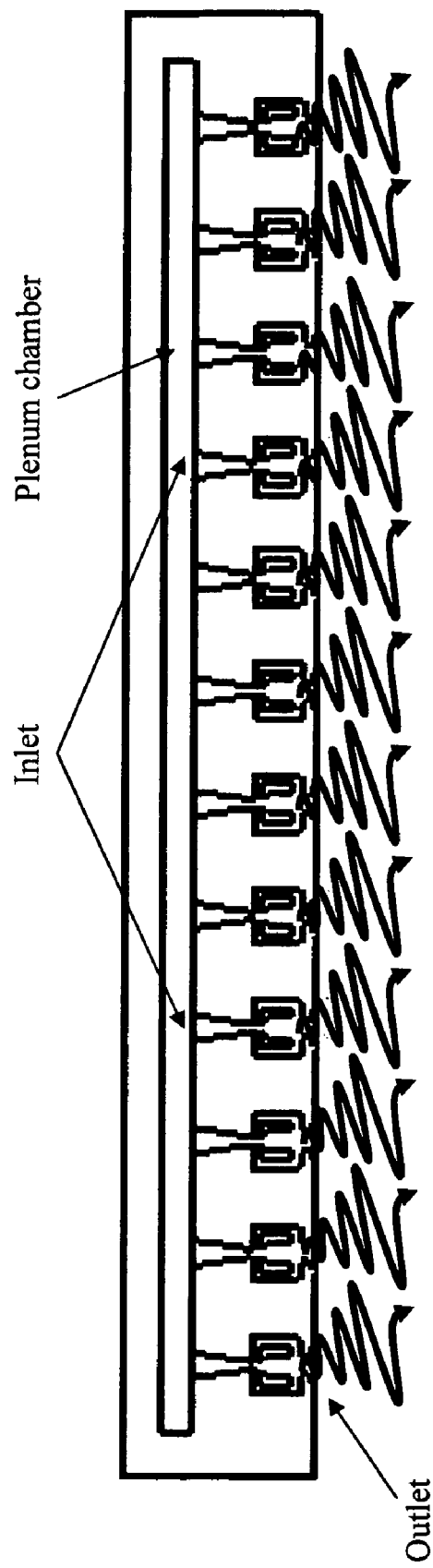

A compact planar array referred to as the "feature plate" is shown in FIG. 7. In order for the compact array of a plurality of discrete fluidic actuators to function, a top cover plate is attached to the feature plate so that the fluid supplied via the plenum to the input ports of the plurality of fluidic actuators exits only through the fluidic actuator exit ports. In certain applications, these arrays can be integrally manufactured along with the wing section or inlet or exit geometries of a jet engine. The fluid is supplied to the plenum chamber by means of a connector in the cover plate. The input pressure can be anywhere from 0.1-150 psi. The fluidic actuator element utilized in the compact array as shown may be a miniature planar bi-stable fluidic oscillator. Each one of the fluidic actuator elements produces an oscillating jet at the exit port. When they are arranged in a compact array, they produce a set of fluid jets of random phase of high velocity (up to sonic exit conditions, 340 m/s for room temperature air) to be able to influence the main flow over the subject surface such as an airfoil of a wing, tail or a windmill blade or the exhaust of an engine. The arrays of jets can be modified to produce synchronous jets if desired. The fluidic actuator elements can also be modified to produce pulsing jets either in the plane of the inflow or perpendicular to the inflow in a linear or staggered array as shown in FIGS. 5 and 6.

Figures 8, 9:
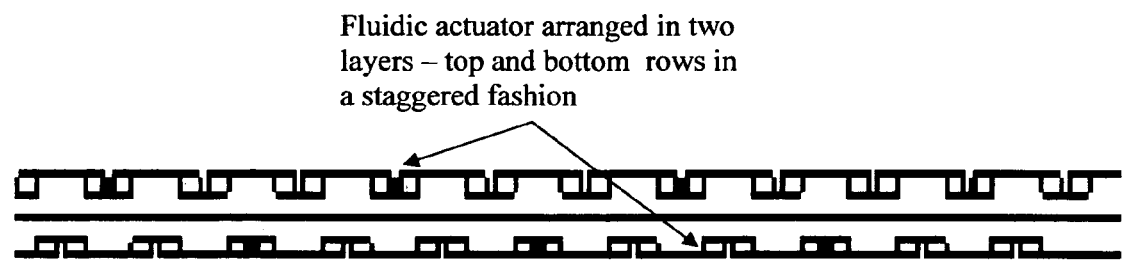
FIG. 8 illustrates a detailed view of a double-sided array of actuators to increase the number of arrays in a given length.
FIG. 9 illustrates a detailed side view of fluidic actuator array having an extension chamber.

FIG. 8 shows an arrangement of an array of plurality of fluidic oscillating actuators on the top and bottom sides of the same feature plate. The top and bottom arrays can have either a common plenum chamber or separate plenum chambers depending on the application.

FIGS. 1, 7 and 8 are for illustration purposes only and it is possible to design the array of fluidic oscillating actuators with other forms of plenum chambers and various types of spacing between each of the individual actuator elements. Furthermore, each element of the array can be designed to produce different flow rates and frequencies thus creating a desired pattern of the air distribution at the exit port of the array as will be required for certain applications of flow control. The fluidic oscillating or pulsing jet actuators of the present invention may be a multilayered structure or in multiple rows in a single layer or in a multilayered structure.

Use of such actuator arrays produces significant improvement in the aerodynamic performance. For example, using such arrays on the flap section of an airplane wing model resulted in almost doubling the lift coefficient compared to the case when no actuator was used. The drag coefficient resulting from employing the arrays of this invention decreased by a factor of about five compared to using no fluidic actuators under the same conditions. The use of the present invention of fluidic arrays in the flap section thus enabled large flap deflections (up to 45 degrees) to obtain large control forces without flow separation.

In certain applications it might be necessary to add a specially designed extension piece or chamber at the exit of the array to direct the flow in the specific or required direction as shown in FIG. 9. This extension can be either fabricated as an integral part of the actuator or as a separate piece which may be mechanically joined to the feature plate by various means such as glue, welding and screws.

What is claimed is:

1. An aerodynamic flow control device comprising a compact arrangement of an array of a plurality of discrete fluidic actuators having non-interconnected feedback channels located on a substrate wherein each of said plurality of said fluidic actuators comprises an input port and an exit port wherein each of said actuators is capable of producing at said exit port an oscillating or sweeping jet either in-plane or perpendicular to the plane of the fluid flow inside said actuator further comprising a common extension chamber extending from the exit ports of said plurality of fluidic actuators thereby directing the exiting flow in a specific or predetermined direction.

2. The aerodynamic flow control device of claim 1 wherein said compact arrangement of the array is in a flat plane structure, a non-planar surface or in an annular geometry.

3. The aerodynamic flow control device of claim 1 wherein said exit ports of said fluidic actuators are in a single plane or in a staggered configuration.

4. The aerodynamic flow control device of claim 1 wherein said compact arrangement of said array of said plurality of fluidic actuators are multilayered or in multiple rows.

5. The aerodynamic flow control device of claim 1 further comprising a plenum chamber commonly connected to each of said plurality of discrete fluidic actuators.

6. The aerodynamic flow control device of claim 1 wherein said compact array of a plurality of fluidic actuators is present on both sides of said substrate.

7. An aerodynamic flow control device comprising a compact composite comprising a compact array of a plurality of discrete fluidic actuators having non-interconnected feedback channels located on a substrate wherein each of said fluidic actuators comprises an input port and an exit port and wherein each of said fluidic actuators is capable of producing oscillating or sweeping jets at said exit port, a plenum chamber commonly connected to each of said plurality of fluidic actuators, a cover plate attached to said compact array of fluidic actuators and said plenum chamber and further comprising a common extension chamber extending from the exit ports of said plurality of fluidic actuators thereby directing the exiting flow in a specific or predetermined direction.

8. The aerodynamic flow control device of claim 7 wherein a fluid is supplied to the plenum chamber by means of a connector integrally attached to the said cover plate.

9. The aerodynamic flow control device of claim 7 wherein said plenum chamber is selected from being integral to said array or being externally connected to said array.

10. The aerodynamic flow control device of claim 7 wherein said extension chamber is either an integrally built component or is an attachment to said compact composite of said fluidic array.

11. The aerodynamic flow control device of claim 7 wherein said compact composite is selected from planar, non-planar or annular geometric structures.

12. A method of flow control or noise reduction in an aerodynamic device comprising the steps of providing a compact array of a plurality of discrete fluidic actuators having non-interconnected feedback channels located on a substrate wherein each of said fluidic actuators comprises an input port, an exit port and a common extension chamber extending from the exit ports of said plurality of fluidic actuators to direct the exiting flow in a specific or predetermined direction, introducing fluid at the said input port of said plurality of fluidic actuators and thereby producing at said exit ports of said plurality of fluidic actuators oscillating or sweeping fluid jets either in-plane or perpendicular to the plane of the fluid flow inside said actuators a resultant flow control or noise reduction in said aerodynamic device.

* * * * *